United States Patent [19]

Hiraoka

[11] Patent Number: 5,552,690
[45] Date of Patent: Sep. 3, 1996

[54] CONTROL UNIT CAPABLE OF IMPROVING A RESPONSE CHARACTERISTIC AND A TRACKING PROPERTY BY SELECTING AN OPTIMUM GAIN IN ACCORDANCE WITH AN OPERATING CONDITION

[75] Inventor: Kazuo Hiraoka, Chiba-ken, Japan

[73] Assignee: Sumitomo Heavy Industries, Ltd., Tokyo, Japan

[21] Appl. No.: 384,225

[22] Filed: Feb. 6, 1995

Related U.S. Application Data

[63] Continuation of Ser. No. 103,139, Aug. 9, 1993, abandoned.

[30] Foreign Application Priority Data

Aug. 10, 1992 [JP] Japan .................................. 4-212927

[51] Int. Cl.$^6$ .................................................. G05D 23/275
[52] U.S. Cl. ........................... 318/632; 318/677; 425/149
[58] Field of Search .................................. 318/560, 561, 318/567, 568.22, 569–572, 600–601, 615–619, 632, 677–678; 425/149; 364/476

[56] References Cited

U.S. PATENT DOCUMENTS

| | | | |
|---|---|---|---|
| 4,697,127 | 9/1987 | Stich et al. ............................. | 318/561 |
| 4,721,895 | 1/1988 | Cocksedge et al. ..................... | 318/618 |
| 5,182,716 | 1/1993 | Stroud, III et al. ..................... | 364/476 |
| 5,196,778 | 3/1993 | Hayashida ............................... | 318/807 |
| 5,237,509 | 8/1993 | Ueta et al. .............................. | 318/632 |

FOREIGN PATENT DOCUMENTS

| | | |
|---|---|---|
| 0461627 | 12/1992 | European Pat. Off. . |
| 58-011128 | 4/1983 | Japan . |
| 63-003928 | 6/1988 | Japan . |
| 63-001518 | 6/1988 | Japan . |
| 3-253319 | 11/1991 | Japan . |
| 4-270625 | 2/1993 | Japan . |

*Primary Examiner*—David S. Martin
*Attorney, Agent, or Firm*—Burns, Doane, Swecker & Mathis, L.L.P.

[57] ABSTRACT

A basic gain providing unit provides a basic gain K0. A boundary detecting unit divides a nonlinear characteristic of a controlled variable component into a plurality of partial characteristics with a boundary interposed between two adjacent ones of the partial characteristics and detects each boundary. A gain changing unit changes the basic gain in response to an output of the boundary detecting unit.

10 Claims, 8 Drawing Sheets

CONTROL UNIT CAPABLE OF IMPROVING A RESPONSE CHARACTERISTIC AND A TRACKING PROPERTY BY SELECTING AN OPTIMUM GAIN IN ACCORDANCE WITH AN OPERATING CONDITION

This application is a continuation of application Ser. No. 08/103,139, filed Aug. 9, 1993, abandoned.

BACKGROUND OF THE INVENTION

This invention relates to a control unit for use in an injection molding machine and, in particular, to a control unit of the type which is capable of improving a response characteristic and a tracking property in a pressure control.

Recently, wide use has been made of an electrical injection molding machine which is driven by a servo motor in place of a hydraulic actuator to inject a resin material into a mold and to manufacture a molded product. In general, the injection molding machine includes an injection unit driven by the servo motor and a controller coupled to the injection unit and the servo motor to control the servo motor by monitoring the injection unit. The injection unit comprises an injection cylinder provided with a hopper and a screw arranged in the injection cylinder. The screw is directly coupled at its rear end to a drive shaft operatively coupled to an injection motor formed by the servo motor. The servo motor rotates the drive shaft to move the drive shaft forwards and backwards. As a result, the screw reciprocates forwards and backwards along a guide bar. A load cell is mechanically coupled to the drive shaft to detect a pressure imposed on the drive shaft.

Description will be made as regards an operation of the injection unit hereinafter.

(1) A resin material is introduced from the hopper into the injection cylinder and is melted into molten resin. The molten resin is conveyed towards a top end portion of the heat cylinder by a predetermined amount by driving the injection motor. This process is referred to as a measuring process. During the measuring process, the screw is slightly retracted due to a back pressure of the molten resin packed into the top end portion of the injection cylinder. The back pressure is detected by the load cell which produces a pressure detection signal representative of the back pressure. The back pressure is controlled by the use of the pressure detection signal in a manner to be described later.

(2) Then, the drive shaft is driven by the injection motor to be moved forwards. A forward end of the screw acts as a piston to inject the molten resin into the mold. This process is referred to as a filling or an injection process. During the injection process, the controller puts the screw into a velocity or speed control mode.

(3) At the end of the injection process, the mold is filled with the molten resin. Then, the controller switches a control mode from the velocity control mode into a pressure control mode. Such a switching operation is called a V-P (velocity to pressure) switching operation. The timing and the manner of the switching operation seriously affect the quality of a molded product.

(4) After the V-P switching operation, the molten resin filled in the mold is cooled and solidified under a predetermined pressure. This process is referred to as a holding process. The pressure applied to the resin is controlled by the controller, like the back pressure.

In the injection unit, the holding process (4) is further succeeded by a next measuring process (1) in a next cycle. On the other hand, a clamping unit is operated to clamp or close the mold during the holding process (4) which is followed by an ejecting process. In the ejecting process, a molded product which has been cooled and solidified is removed or ejected from the mold by opening the mold and by using an ejector mechanism. The mold is thereafter closed again and the ejecting process proceeds to the injection process (2). Thus, the measuring process (1) in the injection unit is carried out simultaneously with the ejecting process in the clamping unit.

During the injection process, a velocity feedback control is carried out by the use of the movement or velocity of the screw. On the other hand, during the holding process, a pressure feedback control is carried out by detecting the reaction force applied to the load cell. Thus, the molding operation is carried out by a combination of the velocity feedback control and the pressure feedback control.

In a conventional pressure control system, an operation pattern signal representative of a target value is produced by an operation pattern generator. For example, such an operation pattern generator is disclosed in Japanese Patent Prepublication No. 253319-1991. The reaction force applied to the load cell is detected as a pressure detection signal. The pressure detection signal is amplified and then subtracted from the operation pattern signal to produce a first error signal. The error signal is multiplied by a basic gain to produce a multiplication result signal. The multiplication result signal is subjected to a compensation calculation to produce a compensated result signal. On the other hand, a velocity detection signal is obtained by amplifying and differentiating a position signal. The velocity detection signal is subtracted from the compensated result signal to produce a second error signal. The second error signal is subjected to a compensation calculation and amplified into a torque command signal.

In the conventional pressure control system described above, an operation characteristic in the pressure control is determined with reference to a single basic gain that is preliminarily selected. With this structure, it is difficult to uniquely define the load in the pressure control system because a wide variety of resin materials and molds are used. In this connection, the gain must be selected at a minimum value in consideration of various conditions. Otherwise, objectionable oscillation occurs in the pressure control system.

When the gain is increased to improve the response characteristic of the pressure control system, a transmission mechanism from the servo motor to the screw may be oscillated due to the remarkable increase in backlash or a difference in efficiency between forward and backward movement of the screw. Under these circumstances, the gain is usually selected to be considerably small. This results in deterioration of accuracy and repeatability of the pressure control.

SUMMARY OF THE INVENTION

It is therefore an object of this invention to provide a control system which is capable of improving a response characteristic and a tracking property in a pressure control by selecting an optimum gain in accordance with an operating condition.

A control unit to which this invention is applicable is for use in an injection molding machine to carry out a control operation with reference to a result of control fed back from a controlled system. According to this invention, the control unit comprises gain providing means for providing a gain, boundary detecting means for dividing a nonlinear characteristic of a controlled variable to detect each boundary of the nonlinear characteristic and to produce a boundary signal representative of each boundary, and gain changing means responsive to the boundary signal for changing the gain of the gain providing means with reference to the boundary signal.

A control unit to which this invention is applicable is for use in an injection molding machine and includes state detecting means for detecting a result of control of a controlled object to produce a detection signal indicative of the result of control. According to another aspect of this invention, the control unit comprises gain memorizing means for memorizing a plurality of gains, boundary detecting means supplied with a signal from the state detecting means for dividing a nonlinear characteristic of a controlled variable to detect each boundary of the nonlinear characteristic and to produce a boundary signal representative of each boundary, and gain selecting means responsive to the boundary signal to select an optimum gain among the plurality of gains memorized in the gain memorizing means.

DESCRIPTION OF THE PREFERRED EMBODIMENTS

Figure 1:
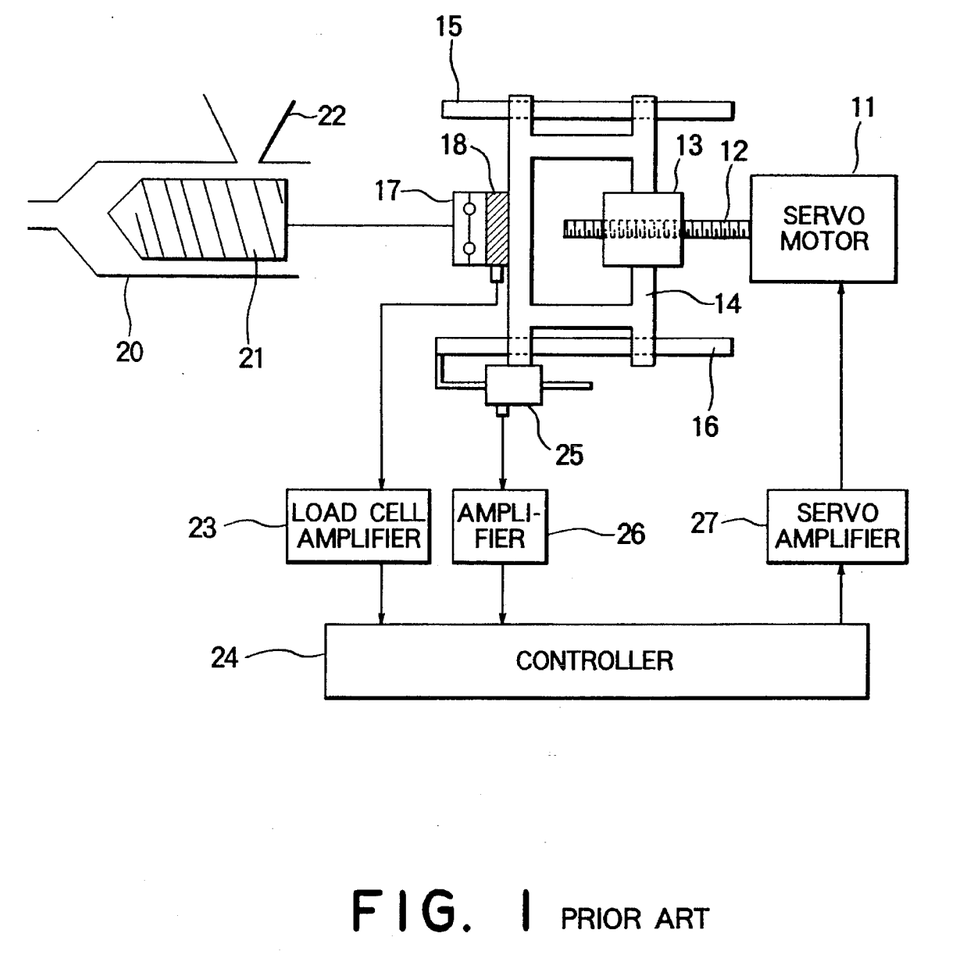
FIG. 1 is a schematic block diagram of an injection unit of a typical injection molding machine.

For a better understanding of this invention, description will at first be made as regards an injection unit of a conventional injection molding machine with reference to FIG. 1.

Referring to FIG. 1, the conventional injection molding machine comprises a servo motor 11 operable as an injection motor, a roller screw 12, and a roller nut 13. The rotation of the servo motor 11 is converted into the linear motion through the roller screw 12 and the roller nut 13 to carry out a filling operation of molten resin. In FIG. 1, the rotation of the servo motor 11 is transmitted to the roller screw 12. With the rotation of the roller screw 12, the roller nut 13 is moved forwards or backwards of FIG. 1. The roller nut 13 is integrally fixed to a slide base 14. The slide base 14 is slidably supported on a pair of guide bars 15 and 16 fixed to a frame (not shown) so as to be moved along the guide bars 15 and 16. With this structure, the slide base 14 conducts a forward or a backward movement together with the roller nut 13. The forward or the backward movement of the slide base 14 is transmitted through a bearing 17 and a pressure sensor (namely, a load cell) 18 to a screw 21 in an injection cylinder 20. To the slide base 14, attached is a position sensor 25 for detecting a position of the screw 21 to produce a position detection signal representative of the position of the screw 21. The position detection signal is given to an amplifier 26 (may be referred to as a first or a position amplifier) and amplified into a first amplified signal which is supplied to a controller 24.

In a measuring process, a resin material is introduced from a hopper 22 into the injection cylinder 20 where the resin material is heated and melted into molten resin.

In an injection process, the screw 21 is moved forwards of FIG. 1 in the injection cylinder 20 to fill a mold (not shown) with the molten resin which has been stored in the injection cylinder 20 during the measuring process. Then, the molten resin is filled in the mold with a pressure applied thereto. At this time, a reaction force is imposed on the load cell 18 against the pressure applied to the molten resin. The reaction force is detected by the load cell 18 to produce a pressure detection signal representative of a detected pressure value. The pressure detection signal is amplified by a load cell amplifier (which will be called a second amplifier) 23 into a second amplified signal to be supplied to the controller 24.

A preset value is also given to the controller 24 by an operator. Under the circumstances, the controller 24 supplies a servo amplifier 27 with an electric current command which corresponds to each process and which is indicative of a torque of the servo motor 11. In response to the electric current command, the servo amplifier 27 varies a drive current for the servo motor 11 to thereby control an output torque of the servo motor 11.

With the above-mentioned structure, during the injection process, the molten resin is filled in the mold, carrying out velocity feedback control which controls a movement velocity or speed of the screw 12.

During the holding process, the resin in the mold is kept at predetermined pressures by carrying out pressure feedback control by monitoring the reaction force applied on the load cell 18. Thus, both the velocity feedback control and the pressure feedback control should be carried out during the molding operation mentioned above.

Figure 2:
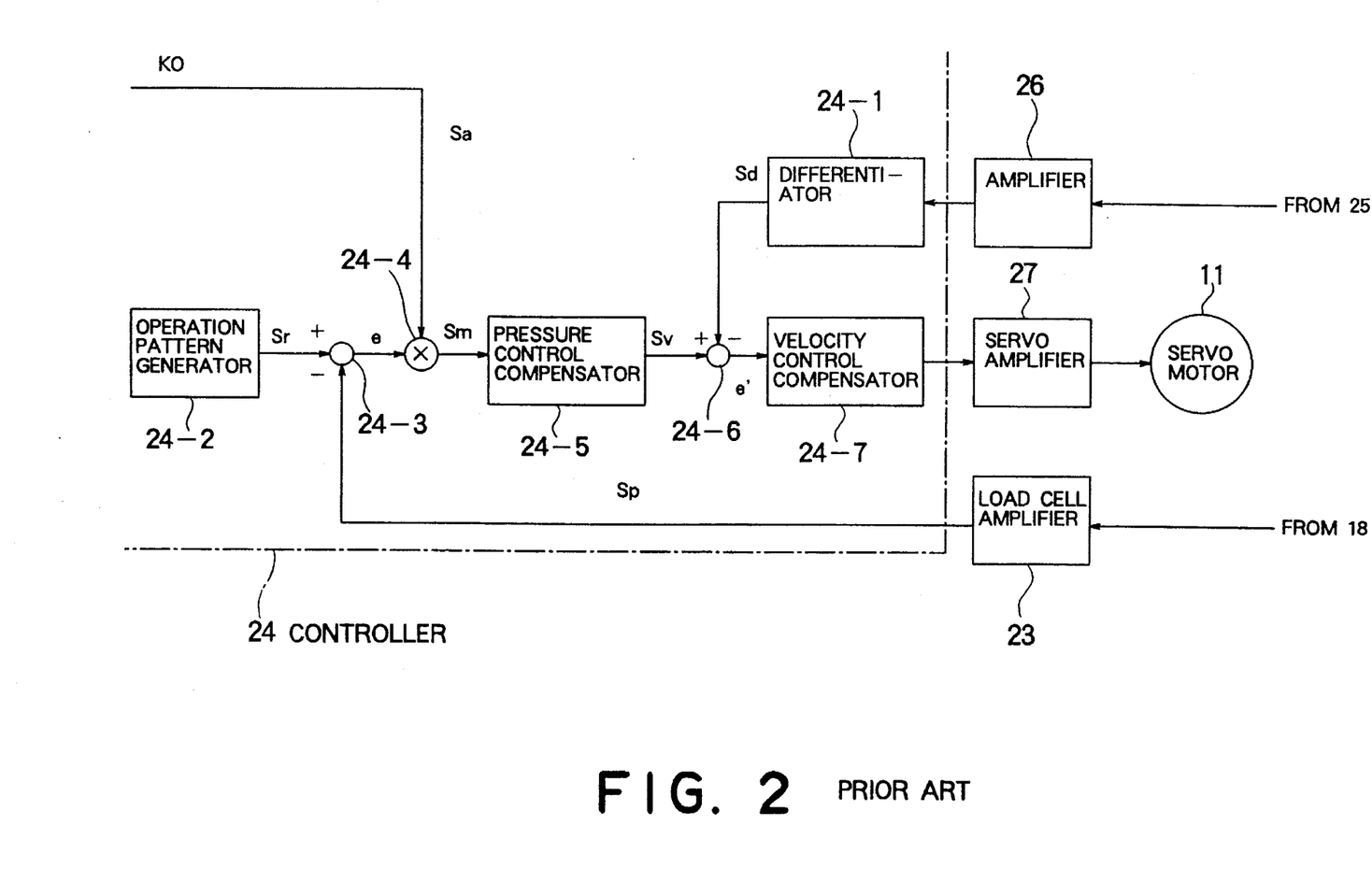
FIG. 2 is a block diagram for describing a structure of a conventional controller which is applied to the injection molding machine illustrated in FIG. 1.

Referring to FIG. 2 in addition to FIG. 1, the controller 24 comprises a differentiator 24-1, an operation pattern generator 24-2, a first subtractor 24-3, a multiplier 24-4, a pressure control compensator 24-5, a second subtractor 24-6, and a velocity control compensator 24-7.

As described above, the controller 24 is given the first and the second amplified signals from the amplifier 26 and the load cell amplifier 23, respectively. The controller 24 is also given the preset value by the operator. With respect to the preset value, the operation pattern generator 24-2 generates an operation pattern signal Sr representative of a target value. The operation pattern signal Sr is selected so as to improve a tracking property of pressure feedback control and to avoid drastic variation of a pressure in the mold.

In FIG. 2, the second amplified signal (depicted at Sp) from the load cell amplifier 23 is supplied to the first subtractor 24-3 and subtracted from the operation pattern signal Sr to produce a first error signal e. The first error signal e is delivered to the multiplier 24-4 and multiplied by a gain signal Sa having a basic gain K0 to produce a multiplication result signal Sm. The multiplication result signal Sm is supplied to the pressure control compensator 24-5 and subjected to compensation calculation to produce a first compensation result signal Sv. The first compensation result signal Sv is delivered to the second subtractor 24-6.

On the other hand, the first amplified signal from the amplifier 26 is differentiated by the differentiator 24 to produce a velocity detection signal Sd. The velocity detection signal Sd is delivered to the second subtractor 24-6. In the second subtractor 24-6, the velocity detection signal Sd is subtracted from the first compensation result signal Sv to produce a second error signal e'. The second error signal e' is supplied to the velocity control compensator 24-7 and subjected to compensation calculation to produce a second compensation result signal. The second compensation result signal is amplified by the servo amplifier 27 and supplied to the servo motor 11 as a torque (current) command.

As described in the preamble of the specification, the above-mentioned conventional controller 24 is disadvantageous in accuracy and reproducibility in the pressure control because the operation characteristic is determined by the user of a single basic gain preliminarily selected.

Figure 3:
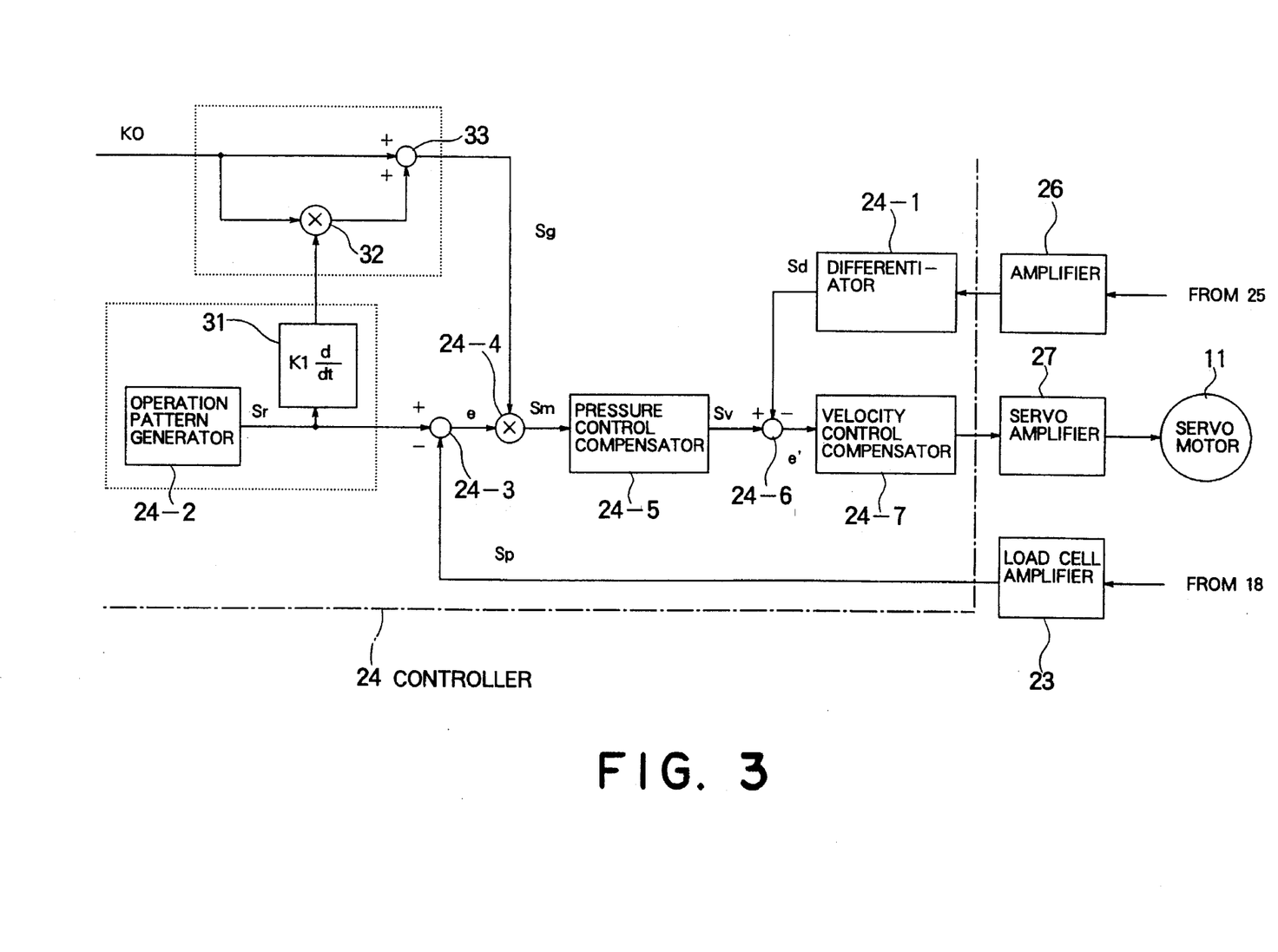
FIG. 3 is a block diagram for describing a structure of a controller of an electrical injection molding machine according to a first embodiment of this invention.

Referring to FIG. 3, description will now be mainly made as regards a controller 24 according to a first embodiment of this invention. In FIG. 1, similar parts are designated by like reference numerals as those described with reference to FIG. 2. The controller 24 has a structure similar to the conventional controller illustrated in FIG. 2 and further comprises a pattern differentiator 31, a gain multiplier 32, and a gain adder 33.

The controller 24 is supplied with the first amplified signal and the second amplified signal Sp from the amplifier 26 and the load cell amplifier 23, respectively. The first amplified signal is differentiated by the differentiator 24-1 to produce the velocity detection signal Sd which is supplied to the second subtractor 24-6 while the second amplified signal Sd is supplied to the first subtractor 24-3, in the manner similar to that described in conjunction with FIG. 2. The operation pattern generator 24-2 generates the operation pattern signal Sr which is also supplied to the first subtractor 24-3.

On the other hand, the operation pattern signal Sr is differentiated by the pattern differentiator 31 and multiplied by a first gain K1 to produce a pattern differential signal. The pattern differential signal is supplied to the gain multiplier 32 and multiplied by the basic gain K0 to produce a gain multiplication signal. The gain multiplication signal is supplied to the gain adder 33 and added to the basic gain K0 to produce a gain signal Sg. The gain signal Sg is supplied to the multiplier 24-4 and multiplied by the first error signal e to produce the first multiplication result signal Sm. The first multiplication result signal Sm is supplied to the pressure control compensator 24-5 and subjected to compensation calculation to produce the first compensated result signal Sv.

The first compensation result signal Sv is supplied to the second subtractor 24-6. The second subtractor 24-6 subtracts the velocity detection signal Sd from the first compensation result signal Sv to produce the second error signal e'. The second error signal e' is supplied to the velocity control compensator 24-7 and subjected to compensation calculation to produce the second compensated result signal. The second compensated result signal is amplified by the servo amplifier 27 and supplied to the servo motor 11 as a torque (current) command.

Temporarily referring to FIG. 1, it is noted that the electrical injection molding machine has different stability limits during the pressure control due to a controlled variable, such as a backlash and a nonviscous friction between the roller screw and the roller nut. Such a nonviscous friction is variable regardless of a velocity. Specifically, the stability limits are varied in dependence upon whether the screw or the transmission mechanism is stopped or moved, whether operation is carried out at a low speed or a high speed, and so on. For example, the stability limit takes a low value when the screw or the transmission mechanism is stopped. otherwise, the stability limit becomes high. This means that unstability or oscillation is liable to occur during the low stability limit.

Let the backlash of the screw be considered as the controlled variable having a nonlinear characteristic. While the screw is moved in a certain direction, the backlash is absorbed and disappeared because a play or gap for the backlash is squeezed due to force pressing in the certain direction. In addition, a friction load is continuously smoothly varied because the moving direction is invariable. At any rate, the stability is increased as the movement becomes large. Thus, the stability limits are varied in dependence upon the controlled variable which has a similar property.

In view of the above, in this embodiment, the operation condition of the driving system is indirectly monitored with reference to the differential value obtained by differentiating the operation pattern signal. The gain in the pressure control system is changed by the use of the differential value.

The control system illustrated in FIG. 3 comprises a velocity feedback control system formed by the position detector 25, the amplifier 26, the differentiator 24-1, the second subtractor 24-6, the velocity control compensator 24-7, the servo amplifier 27, and the servo motor 11 in addition to the pressure control system. The velocity feedback control system can be simplified into a velocity control system which is assumed to have a response speed considerably greater than that of the pressure control system. Herein, it is also assumed that the pressure control compensator 24-5 is implemented by a proportional compensator having a second gain K2 and that a specific one of the components is selected from the loads imposed on the resin and is represented as an integral element of a gain K3 related to the movement velocity of the screw.

Figure 4:
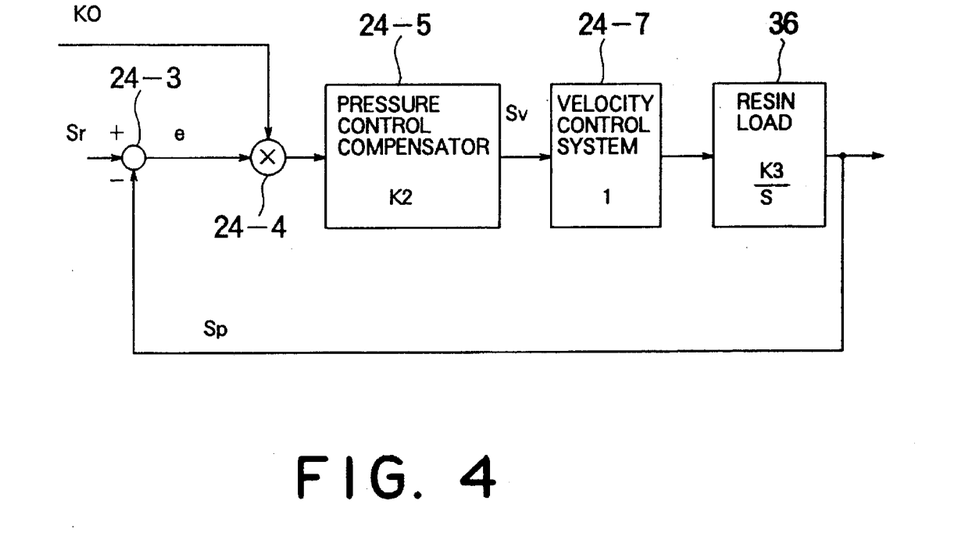
FIG. 4 is a simplified block diagram of the structure illustrated in FIG. 3.

Under the circumstances, the structure in FIG. 3 is simplified into that illustrated in FIG. 4. The reference symbol S in the resin load 36 represents a Laplace operation. The velocity control system 24-7 is represented as a quick response system which has a gain equal to unity in FIG. 4. A relationship between the operation pattern signal Sr and the first compensated result signal Sv is defined by a transfer function and is given by Equation (1):

$$Sv/Sr = K0 \cdot K2 \cdot S/(S + K0 \cdot K2 \cdot K3) \qquad (1)$$

Equation (1) indicates that the velocity is obtained by differentiating the operation pattern signal Sr. In other words, differentiation of the operation pattern signal Sr gives a parameter which, although indirectly, indicates the state or the dimension of the operation of the screw during the pressure control.

In this embodiment, it is assumed here that a control gain becomes equal to K10 which corresponds to the stability limit given when the pressure control system is put in a stopped or a stable state. When the operation is performed at a maximum magnitude, let the operation pattern signal Sr have a variation ratio of $\Delta Srmax$. In this situation, the control gain is increased at an increment ratio x with respect to the control gain K10.

Referring to FIGS. 3 and 4, it is assumed here that:

K0= K10 and

K1=x/$\Delta Srmax$.

In this event, the gain signal Sq is given by:

Sg=K10 (in the stopped state)

and

Sg=(1+$\Delta Srmax$.K1)·K10=(1+x)·K10 (in the maximum operation state).

Herein, the gain signal Sg represents a function indicative of a boundary which is capable of improving the control gain without exceeding the stability limits. The multiplier 24-4 carries out feedback control by the use of the gain signal Sg.

Figure 5:
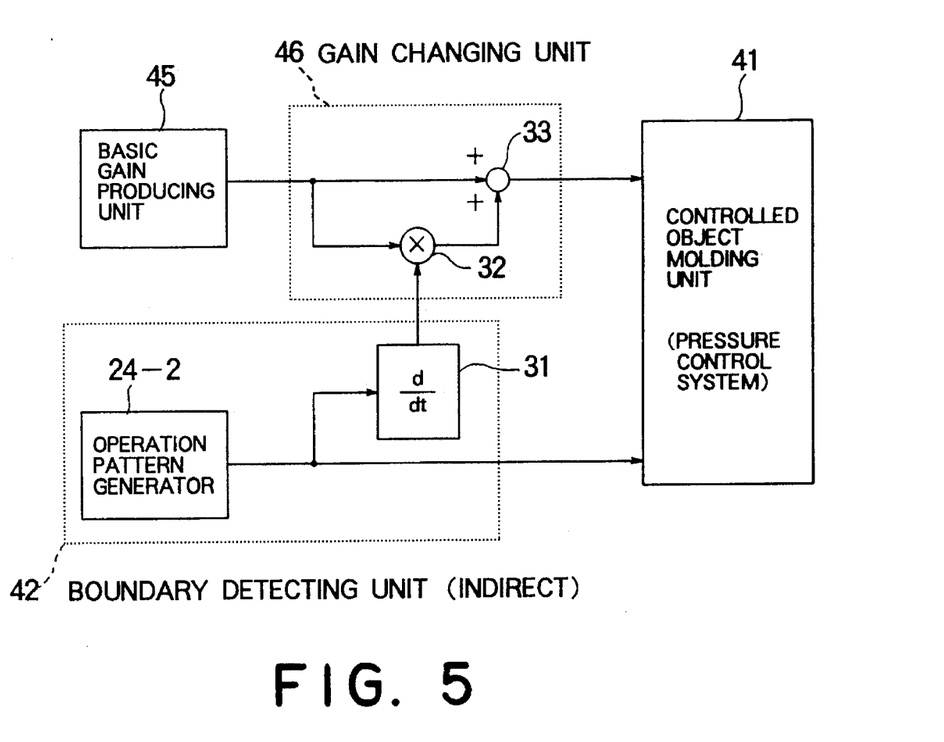
FIG. 5 is a block diagram illustrating a main portion of the controller illustrated in FIG. 3.

FIG. 5 is a view which is similar to FIG. 3 except that a subject portion alone is illustrated in detail with the remaining portions simplified. A combination of the operation pattern generator 24-2 and the pattern differentiator 31 in FIG. 3 serves as a boundary detecting unit 42. In FIG. 5, a control system molding unit 41 represents a pressure control system in the injection molding machine wherein the filling operation is carried out by converting the rotation into the linear motion through the roller screw and the roller nut as illustrated in FIG. 1.

In addition, it is assumed that the pressure control system contains a nonlinear component or element which can not linearly increase the feedback compensation gain and, as a result, which is specified by a nonlinear characteristic.

The boundary detecting unit 42 detects a boundary of each element of the control system divided by nonlinearity of the controlled object molding unit 41. More specifically, the boundary detecting unit 42 divides the controlled variable of the nonlinear component into a plurality of partial characteristics each of which may be regarded as a linear characteristic. Each boundary is interposed between two adjacent ones of the partial characteristics.

A combination of the gain multiplier 32 and the gain adder 33 acts as a gain changing unit 46. The gain changing unit 46 is supplied with differential values of successive operation pattern signals and operated to successively change the basic gain K0 supplied from a basic gain providing unit 45 with respect to the basic value when the differential value is equal to zero.

FIGS. 6 through 13 show schematic block diagram illustrating subject portions of controllers according to second through eighth embodiments of this invention. In these figures, similar parts are designated by like reference numerals.

Figure 6:
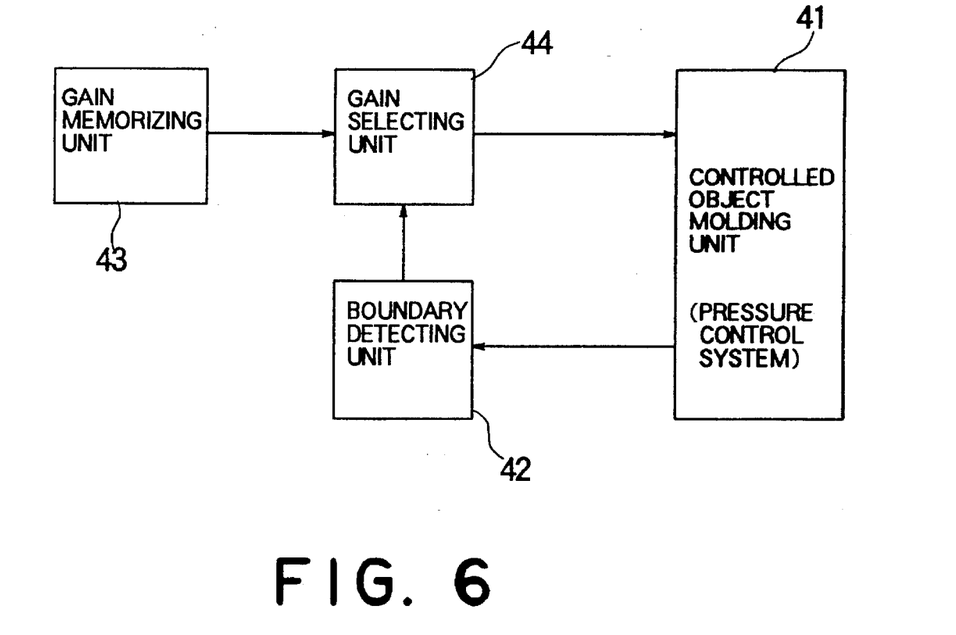
FIG. 6 is a block diagram illustrating a main portion of a controller according to a second embodiment of this invention.

Referring to FIG. 6, the controlled object molding unit 41 represents the pressure control system in the injection molding machine wherein the filling operation is carried out by converting the rotation into the linear motion through the roller screw and the roller nut as illustrated in FIG. 1. The control system is assumed to contain a nonlinear element or component (i.e., controlled variable) like in FIG. 5. In the example being illustrated, a gain memorizing unit 43 is for memorizing an optimum control gain corresponding to an upper limit level for each divided element of the control system so that the stability of the pressure control system is not degraded. A gain selecting unit 44 selects the optimum gain from the gain memorizing unit 43 in response to the output signal of the boundary detecting unit 42.

Figure 7:
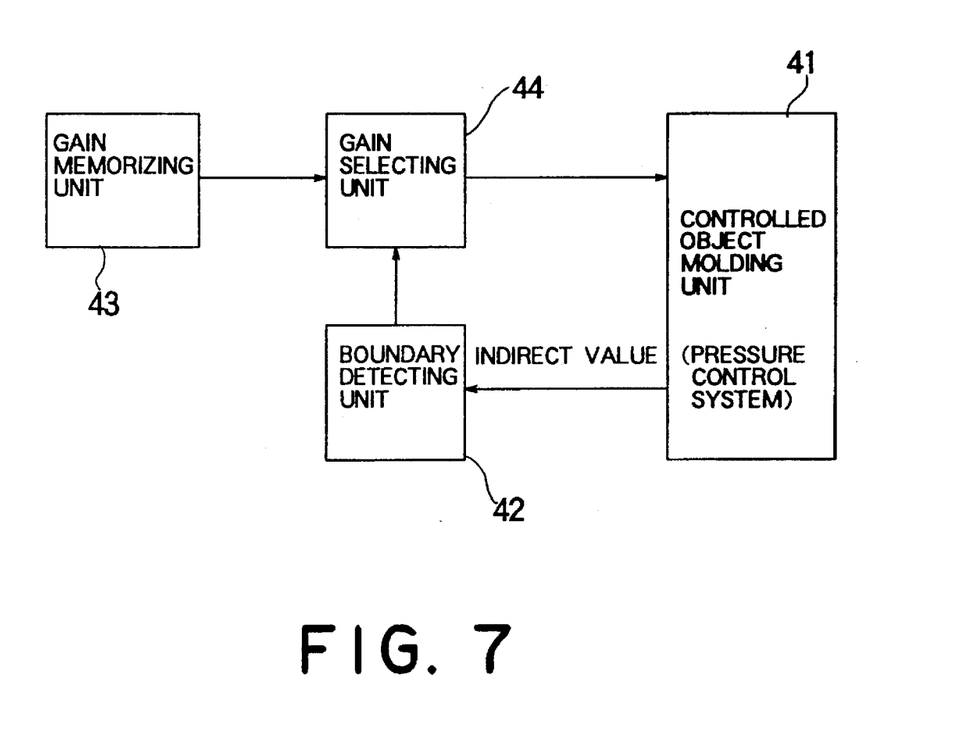
FIG. 7 is a block diagram illustrating a main portion of a controller according to a third embodiment of this invention.

Referring to FIG. 7, no direct detection can be made about the boundary divided by nonlinearity of the control system molding unit 41. In this event, the boundary detecting unit 42 is supplied with an indirect detection value indirectly indicative of the state of the molding machine by means of correlation. Subsequent operation is similar to that described in conjunction with FIG. 6.

Figure 8:
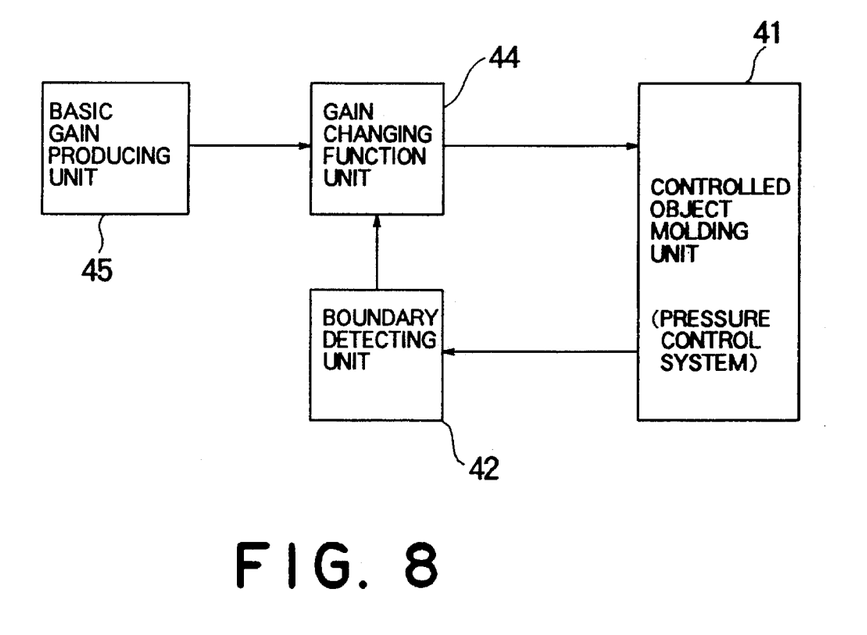
FIG. 8 is a block diagram illustrating a main portion of a controller according to a fourth embodiment of this invention.

Referring to FIG. 8, the control system molding unit 41 does not contain any obvious boundary of nonlinearity but exhibits consecutive variation. In this event, the boundary detecting unit 42 controls the gain changing function unit 46 by the use of a series of functions to change the ratio with respect to the basic gain K0 supplied from the basic gain providing unit 45.

Referring to FIGS. 9 through 12, these embodiments are particularly effective in preventing oscillation caused by phase lag due to backlash or oscillation caused by the difference in efficiency of the roller screw and the roller nut between a pressurized state and a depressurized state.

Figure 9:
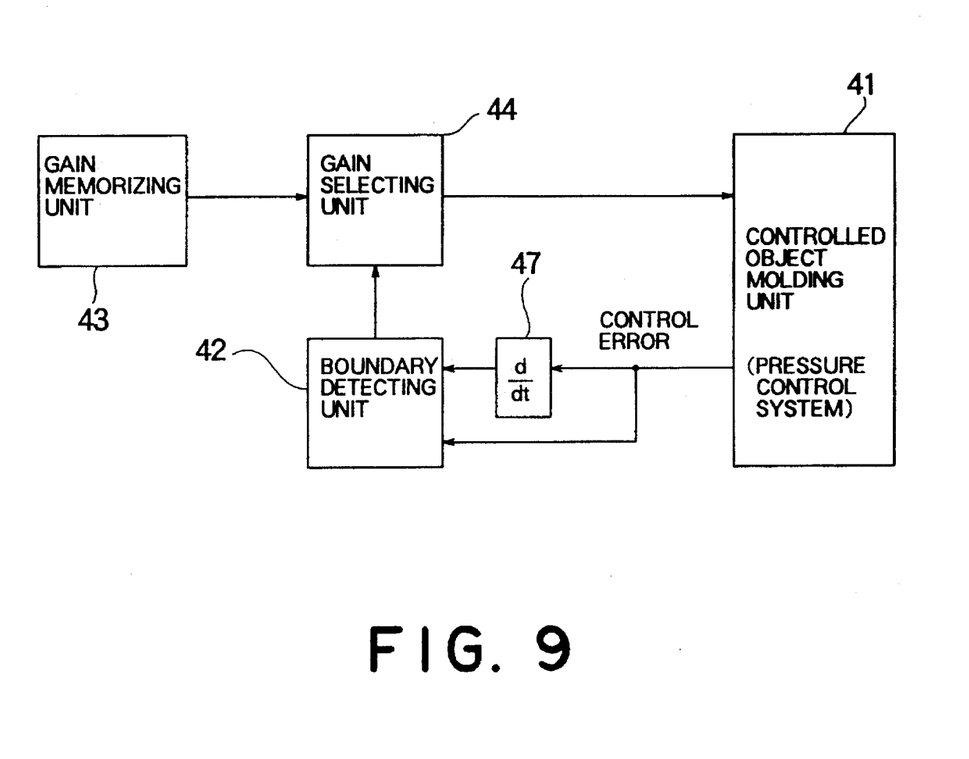
FIG. 9 is a block diagram illustrating a main portion of a controller according to a fifth embodiment of this invention.

Referring to FIG. 9, the boundary detecting unit 42 is supplied with a control error, namely, a pressure error during the pressure control in the control system molding unit 41. The boundary detecting unit 42 is also supplied from a differentiator 47 with a differential value obtained by differentiating the pressure error. In response, the boundary detecting unit 42 controls the gain selecting unit 44. Thus, the gain is changed by the use of the boundary on a plane.

Figure 10:
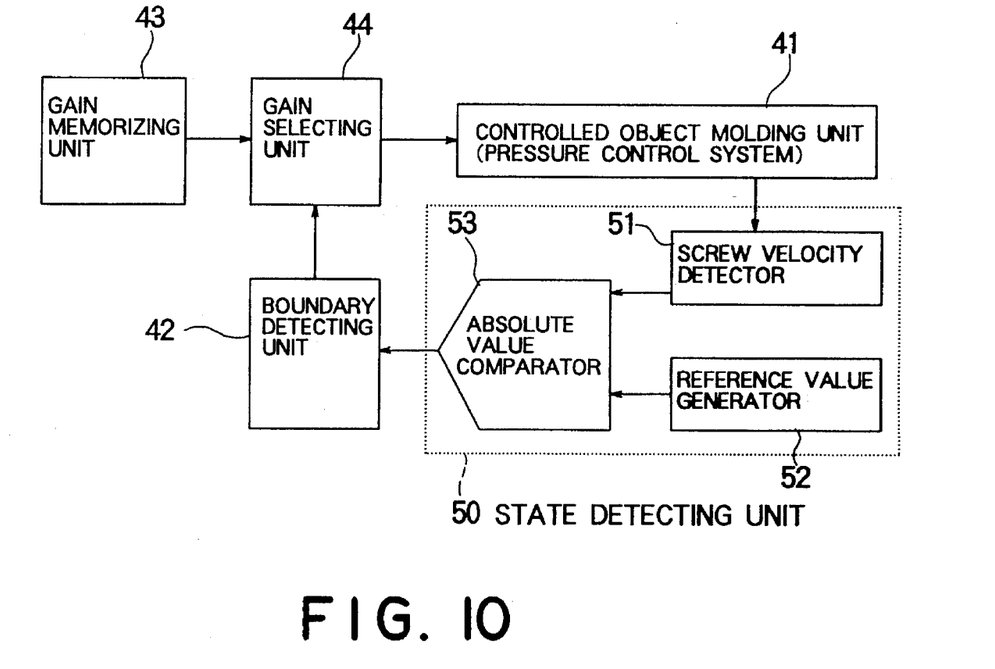
FIG. 10 is a block diagram illustrating a main portion of a controller according to a sixth embodiment of this invention.

Referring to FIG. 10, a state detecting unit 50 for detecting the state of the control system is formed by a combination of a screw velocity detector 51 for detecting the movement velocity of the screw during the pressure control in the control system molding unit 41, a reference value generator 52, and an absolute value comparator 53. The absolute value comparator 53 compares a reference value supplied from the reference value generator 52 and an output signal of the screw velocity detector 51 to produce a comparator output signal. The comparator output signal is detected by the boundary detecting unit 42 to control the gain selecting unit 44. Thus, the gain is controllably changed in the vicinity of the stopped state and the others.

Figure 11:
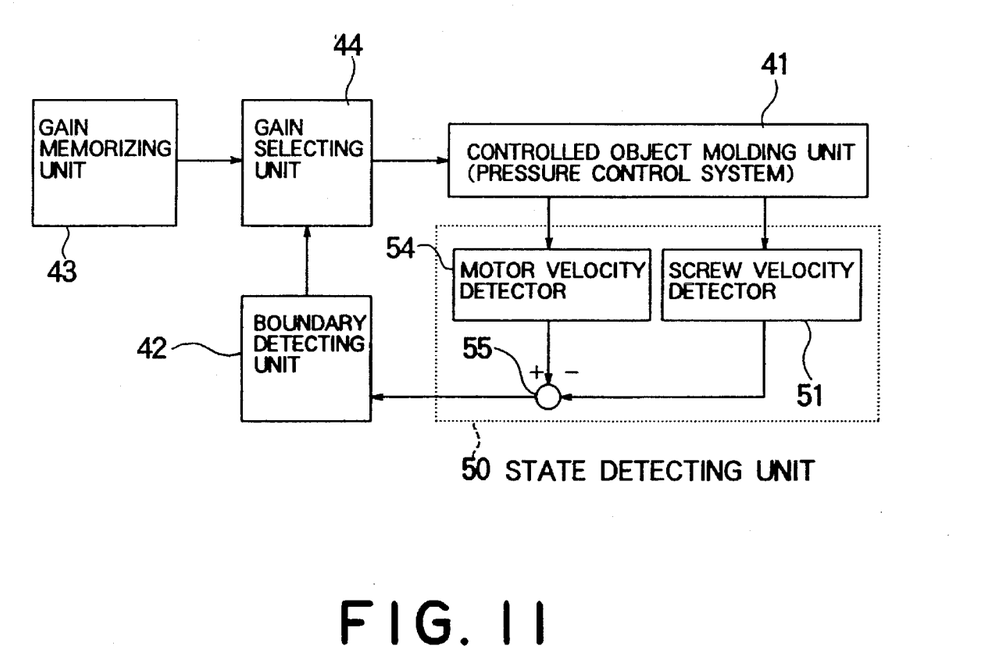
FIG. 11 is a block diagram illustrating a main portion of a controller according to a seventh embodiment of this invention.

Referring to FIG. 11, the state detecting unit 50 for detecting the state of the control system is formed by a combination of the screw velocity detector 51 for detecting the movement velocity of the screw during the pressure control in the controlled object molding unit 41, a motor velocity detector 54 for detecting the velocity of the driving motor, and a subtractor 55. The subtractor 55 is supplied with output signals of the screw velocity detector 51 and the motor velocity detector 54 and detects the difference between the movement or the velocity of the screw and the rotation or the velocity of the motor. With reference to the difference thus detected, the boundary detecting unit 42 controls the gain selecting unit 44 to controllably change the gain.

Figure 12:
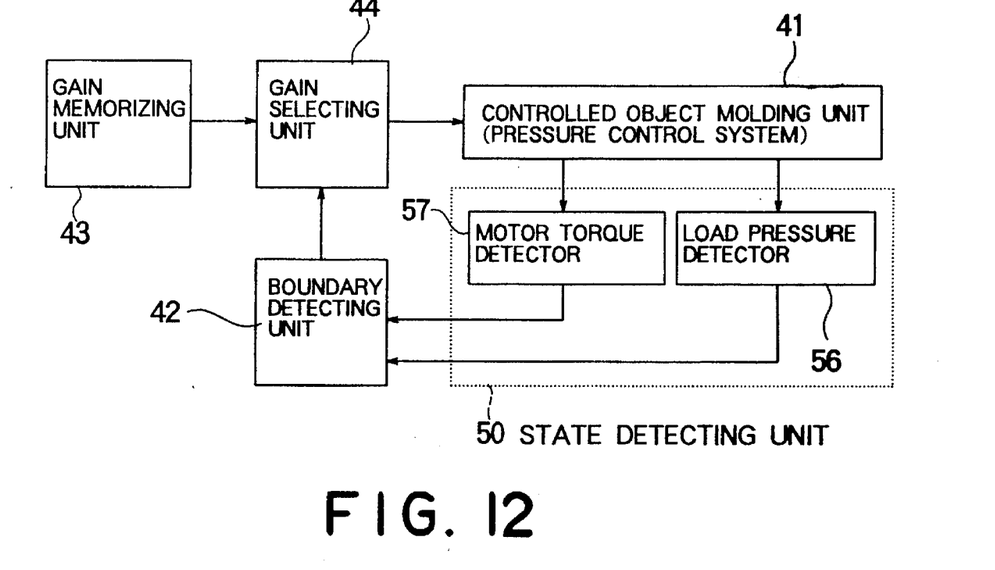
FIG. 12 is a block diagram illustrating a main portion of a controller according to an eighth embodiment of this invention.

Referring to FIG. 12, the state detecting unit 50 for detecting the state of the controlled object is formed by a combination of a load pressure detector 56 and a motor torque detector 57. During the pressure control in the controlled object molding unit 41, the boundary detecting unit 42 controls the gain selecting unit 44 in accordance with the polarities of a motor driving current and a pressure load. Thus, the gain is controllably changed.

Figure 13:
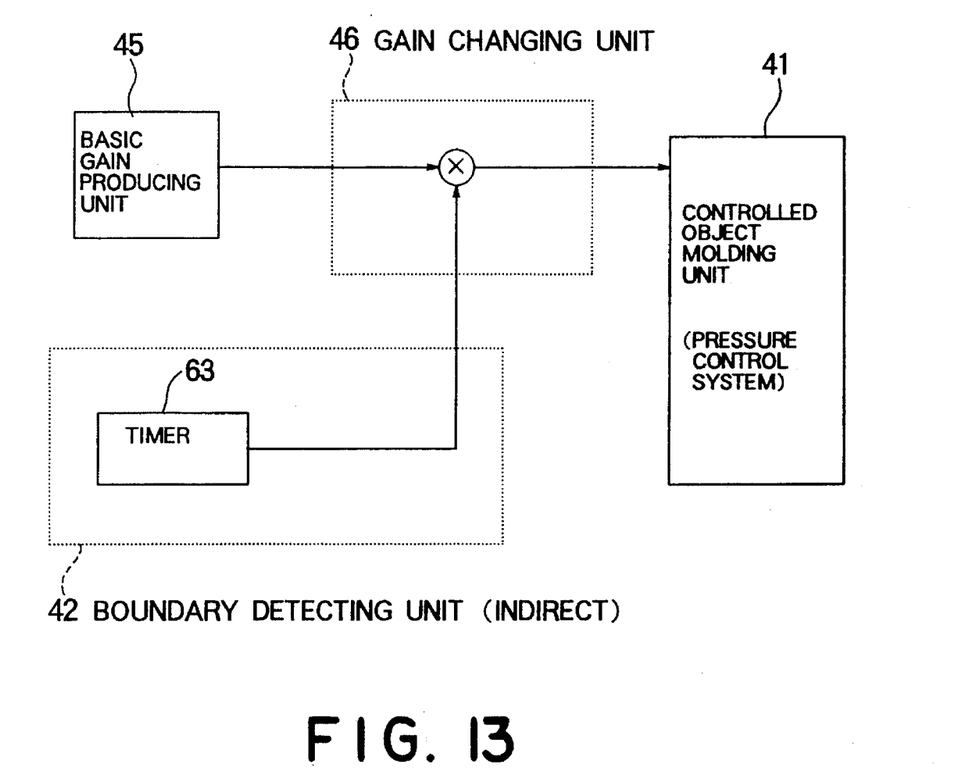
FIG. 13 is a block diagram illustrating a main portion of a controller according to a ninth embodiment of this invention.

Referring to FIG. 13, the boundary detecting unit 42 comprises a timer 63 for measuring the lapse of time from the start of injection during the pressure control in the injection molding machine by counting clock pulses. Supplied with the basic gain K0 from the basic gain providing unit 45, the gain changing unit 46 successively changes the gain, as the count proceeds, with respect to the basic value corresponding to a stability limit when the resin in the mold has completely been solidified.

As described above, according to this invention, in the pressure control where the load imposed on the resin is a substantially integral load, the optimum gain is selected by monitoring the operating condition. Thus, it is possible to provide an accurate and reproducible pressure control. Specifically, it is possible to provide an excellent tracking property even in the operating condition in which the operation is controllably followed by changing the gain from a small level in the stopped state to a large level in a large movement state.

In the foregoing description, this invention is applied to the pressure control in the injection molding machine. However, this invention is also applicable to a back pressure control, a screw rotation control, a mold open/close velocity control, a clamping force control, an injection pressure control, or the like.

What is claimed is:

1. A control unit for use in an injection molding machine to carry out a control operation with reference to feedback from a controlled object, said control unit comprising:

gain providing means for providing a gain;

boundary detecting means for dividing a nonlinear characteristic of a controlled variable into a plurality of partial characteristics to detect a boundary for each said partial characteristic of said nonlinear characteristic and to produce a boundary signal representative of each boundary; and gain changing means responsive to said boundary signal for changing said gain of said gain providing means with reference to said boundary signal.

2. A control unit as claimed in claim 1, wherein said gain providing means provides a basic gain as said gain, said boundary detecting means including:

operation pattern producing means for producing an operation pattern; and differentiating means for calculating a differential value of said operation pattern to produce said differential value as said boundary signal;

said gain changing means being responsive to said differential value of said operation pattern to successively change said basic gain with reference to a value calculated when said differential value is equal to zero.

3. A control unit as claimed in claim 1, said molding machine comprising a mold into which resin is injected;

said gain providing means providing a basic gain;

said boundary detecting means including:

measuring means for measuring a lapse of time from the start of injection to produce a measurement result signal indicative of said lapse of time;

said gain changing means being responsive to said measurement result to successively change said basic gain with reference to a stability limit gain obtained when said resin has completely been solidified in said mold.

4. A control unit as claimed in claim 1, wherein said boundary detecting means divides said non-linear characteristic into a plurality of linear partial characteristics.

5. A control unit which is for use in an injection molding machine and which includes state detecting means for detecting a result of control of a controlled object to produce a detection signal indicative of said result of control, said control unit comprising:

gain memorizing means for memorizing a plurality of gains;

boundary detecting means supplied with a signal from said state detecting means for dividing a nonlinear characteristic of a controlled variable into a plurality of partial characteristics to detect a boundary for each said partial characteristic of said nonlinear characteristic and to produce a boundary signal representative of each boundary; and gain selecting means responsive to said boundary signal to select an optimum gain among said plurality of gains memorized in said gain memorizing means.

6. A control unit as claimed in claim 5, wherein said state detecting means is supplied with a feedback value and a desired value and includes;

differentiating means for differentiating a difference between said feedback value and said desired value.

7. A control unit as claimed in claim 5, wherein said state detecting means includes;

screw velocity detecting means for detecting a movement velocity of a screw as a detected screw velocity;

reference value producing means for producing a screw velocity reference value; and comparing means for comparing said detected screw velocity and said reference value.

8. A control unit as claimed in claim 5, wherein said state detecting means includes;

screw velocity detecting means for detecting a movement velocity of a screw as a detected screw velocity;

motor velocity detecting means for detecting a velocity of a screw driving motor as a detected motor velocity; and subtracting means for calculating a difference between said detected screw velocity and said detected motor velocity.

9. A control unit as claimed in claim 5, wherein said state detecting means includes:

load pressure detecting means for detecting a load pressure; and motor torque detecting means for detecting a torque of a screw driving motor.

10. A control unit as claimed in claim 5, wherein said boundary detecting means divides said non-linear characteristic into a plurality of linear partial characteristics.

* * * * *